US011069946B2

(12) United States Patent
Kim

(10) Patent No.: US 11,069,946 B2
(45) Date of Patent: Jul. 20, 2021

(54) RECHARGEABLE BATTERY PACK

(71) Applicant: Samsung SDI Co., Ltd., Yongin-si (KR)

(72) Inventor: Dukjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 217 days.

(21) Appl. No.: 15/699,915

(22) Filed: Sep. 8, 2017

(65) Prior Publication Data
US 2018/0130996 A1 May 10, 2018

(30) Foreign Application Priority Data
Nov. 8, 2016 (KR) .................. 10-2016-0148231

(51) Int. Cl.
*H01M 50/578* (2021.01)
*H01M 50/10* (2021.01)
(Continued)

(52) U.S. Cl.
CPC ......... *H01M 50/578* (2021.01); *H01M 50/10* (2021.01); *H01M 50/20* (2021.01);
(Continued)

(58) Field of Classification Search
CPC .. H01M 2/345; H01M 2/1252; H01M 2/1077; H01M 2/305; H01M 2/206;
(Continued)

(56) References Cited

U.S. PATENT DOCUMENTS 5,140,744 A * 8/1992 Miller .................... A47B 87/00
29/730
2012/0058382 A1* 3/2012 Carignan ................. B60L 3/04
429/158
(Continued)

FOREIGN PATENT DOCUMENTS

JP 2012-181977 * 9/2012 ............. H01M 2/10
JP 2012-181977 A 9/2012
(Continued)

OTHER PUBLICATIONS

English Translation of JP 2012-181977.*
(Continued)

*Primary Examiner* — Milton I Cano
*Assistant Examiner* — Kiran Akhtar
(74) *Attorney, Agent, or Firm* — Lewis Roca Rothgerber Christie LLP

(57) ABSTRACT

A rechargeable battery pack may improve safety of the rechargeable battery pack by interrupting a high voltage of a module when a defect of a unit cell occurs. A rechargeable battery pack includes: unit cells configured to be repeatedly charged or discharged; bus bars configured to electrically connect electrode terminals of the unit cells; a housing configured to accommodate the unit cells; a first final terminal and a second final terminal configured to draw respective electrode terminals provided at outermost unit cells of the unit cells out of the housing; and a high voltage interruption device configured to be provided at the first final terminal and to electrically connect or disconnect a high voltage line according to an internal pressure generated when a defect of a unit cell of the unit cells occurs.

12 Claims, 11 Drawing Sheets

(51) Int. Cl.
  *H01M 50/20* (2021.01)
  *H01M 50/35* (2021.01)
  *H01M 50/502* (2021.01)
  *H01M 50/543* (2021.01)
  *H01M 50/342* (2021.01)

(52) U.S. Cl.
  CPC ....... *H01M 50/3425* (2021.01); *H01M 50/35* (2021.01); *H01M 50/502* (2021.01); *H01M 50/543* (2021.01); *H01M 2200/20* (2013.01); *H01M 2220/20* (2013.01)

(58) Field of Classification Search
  CPC ...... H01M 2/237; H01M 2/30; H01M 2/1241; H01M 2/202; H01M 2/307; H01M 2/12; H01M 2220/20; H01M 2200/20; H01M 10/42; H01M 10/425; H01M 10/44; H01M 2010/4271; H01M 50/578; H01M 50/10; H01M 50/20; H01M 50/35; H01M 50/502; H01M 50/543; H01M 50/3425
  See application file for complete search history.

(56) References Cited

U.S. PATENT DOCUMENTS

| | | | | |
|---|---|---|---|---|
| 2012/0183838 A1* | 7/2012 | An | .................. | H01M 2/202 |
| | | | | 429/158 |
| 2013/0252038 A1* | 9/2013 | Kim | .................... | H01M 2/1077 |
| | | | | 429/61 |
| 2013/0337306 A1* | 12/2013 | Han | ...................... | H01M 2/202 |
| | | | | 429/99 |
| 2014/0322566 A1* | 10/2014 | Kim | .................... | H01M 2/1016 |
| | | | | 429/56 |
| 2015/0132618 A1* | 5/2015 | Han | ...................... | H01M 2/345 |
| | | | | 429/53 |
| 2015/0140393 A1* | 5/2015 | Yamamoto | ............ | H01M 2/305 |
| | | | | 429/121 |
| 2015/0295221 A1* | 10/2015 | Urano | .................... | H01M 2/22 |
| | | | | 429/61 |

FOREIGN PATENT DOCUMENTS

| | | | |
|---|---|---|---|
| JP | 2014-035807 A | 2/2014 | |
| KR | 10-2015-0053597 A | 5/2015 | |
| WO | WO 2014080518 * | 5/2014 | ............. H01M 2/02 |

OTHER PUBLICATIONS

Korean Office Action in corresponding Korean Application No. 10-2016-0148231, Korean Office Action dated Oct. 27, 2020 (4 pgs.).

* cited by examiner

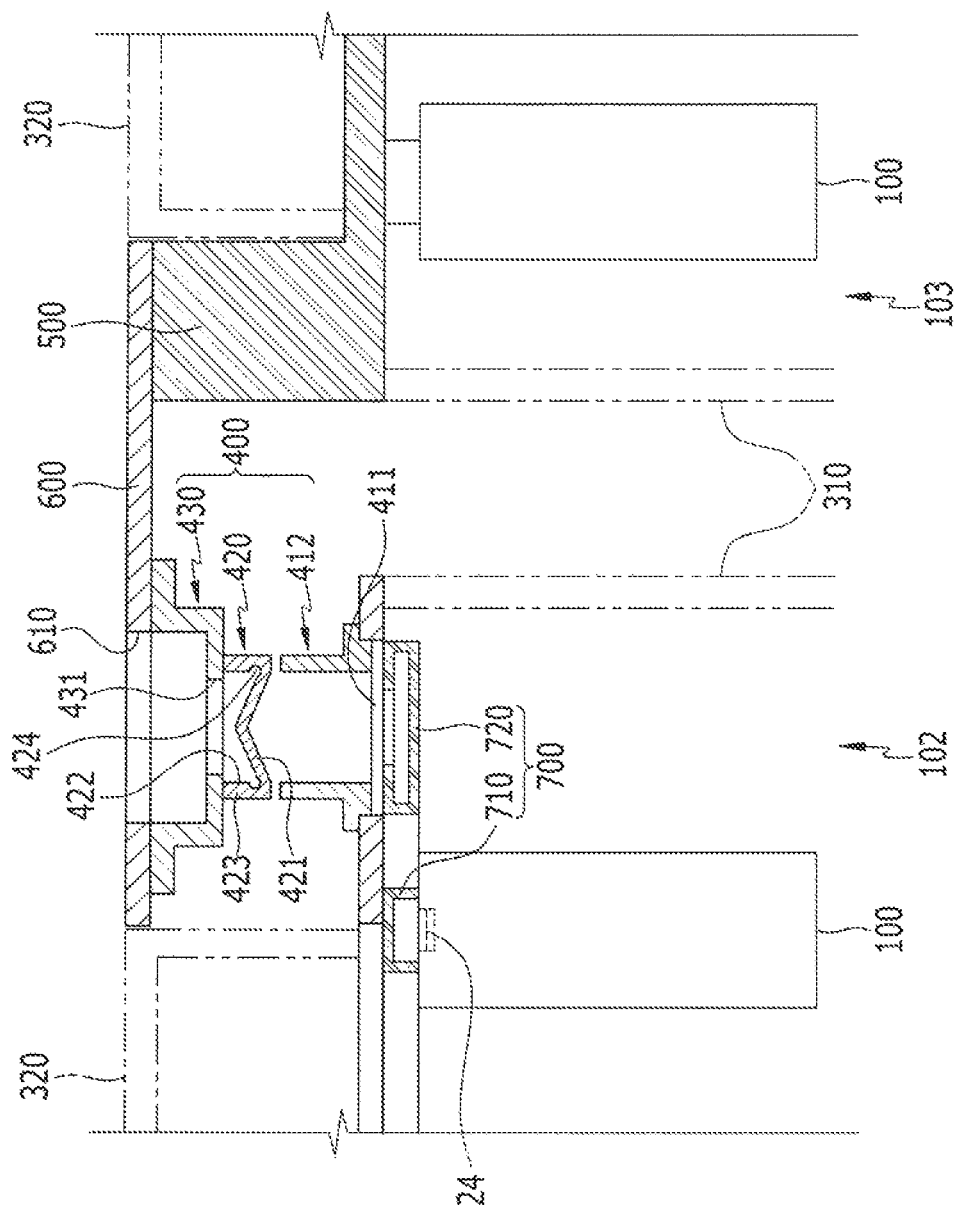

RECHARGEABLE BATTERY PACK

CROSS-REFERENCE TO RELATED APPLICATION

This application claims priority to and the benefit of Korean Patent Application No. 10-2016-0148231 filed on Nov. 8, 2016 in the Korean Intellectual Property Office, the entire content of which is incorporated herein by reference.

BACKGROUND

1. Field

Aspects of embodiments of the present disclosure relate to a rechargeable battery pack.

2. Description of the Related Art

A rechargeable battery differs from a primary battery in that it can be repeatedly charged and discharged, while the latter is incapable of being recharged. A low-capacity rechargeable battery may be used in small portable electronic devices, such as mobile phones, notebook computers, and camcorders, while a high-capacity rechargeable battery can be used as a power source for driving motors of a hybrid vehicle, an electric vehicle, and the like.

The rechargeable battery may be used as a unit cell, such as for a small electronic device, or as a pack state electrically connecting a plurality of unit cells to each other, such as for driving a motor. The rechargeable battery module or pack may be formed by connecting electrode terminals of unit cells to each other through bus bars.

Because of overcharging, or misuse and degradation due to characteristics, a defect may occur in the unit cell. Accordingly, gas is generated or accumulated in the unit cell, and thus the unit cell may explode.

As safety devices for preventing such a problem, there are a current interruption device (CID) that is provided in the unit cell to interrupt a high voltage and an overcharge safety device (OSD) that induces a short circuit to the outside thereof during overcharging.

Since the safety devices, such as the CID and the OSD, are provided in the unit cell, problems such as operation distribution and resistance increase of a high voltage may occur, and the safety device may react with an electrolyte solution to cause a fire when a defect occurs.

The above information disclosed in this Background section is only for enhancement of understanding of the background of the invention and, therefore, it may contain information that does not form the prior art that is already known in this country to a person of ordinary skill in the art.

SUMMARY

According to an aspect of embodiments of the present invention, a rechargeable battery pack has improved safety of the entire rechargeable battery pack when a defect occurs in a unit cell. According to another aspect of embodiments of the present invention, a rechargeable battery pack has improved safety of the rechargeable battery pack by interrupting a high voltage of a module when a defect of a unit cell occurs. According to another aspect of embodiments of the present invention, a rechargeable battery pack has improved safety of the rechargeable battery pack by interrupting a high voltage of a module even when a defect of a unit cell is not detected.

According to an exemplary embodiment of the present invention, a rechargeable battery pack includes: unit cells configured to be repeatedly charged or discharged; bus bars configured to electrically connect electrode terminals of the unit cells; a housing configured to accommodate the unit cells; a first final terminal and a second final terminal configured to draw respective electrode terminals provided at outermost unit cells of the unit cells out of the housing; and a high voltage interruption device configured to be provided at the first final terminal and to electrically connect or disconnect a high voltage line according to an internal pressure generated when a defect of a unit cell of the unit cells occurs.

The first final terminal provided with the high voltage interruption device may include: a pressure via-member configured to be electrically connected to an electrode terminal of an outermost unit cell of the outermost unit cells and to pass the internal pressure generated when the defect of the unit cell occurs through a first through-hole; an inverting member configured to supply or interrupt a high voltage by closing and sealing or opening the first through-hole of the pressure via-member according to the internal pressure; and a supporting member configured to support the inverting member electrically connected to the inverting member.

The housing may include: a body configured to accommodate the unit cells; and a cover configured to be air-tightly combined to the body to cover the unit cells.

In the pressure via-member, a portion connected to the electrode terminal may be arranged inside the housing, and a portion connected to the inverting member at a side of the first through-hole may be drawn out through a portion in which the body and the cover are combined.

When the internal pressure is a normal pressure, the inverting member may maintain a state attached to the first through-hole, and when the internal pressure is an excessive pressure greater than the normal pressure, the inverting member may be inverted to be separated from the first through-hole.

The first through-hole of the pressure via-member may have a circular shape, the pressure via-member may include a cylindrical guide member configured to be air-tightly and electrically connected to the first through-hole to guide an internal pressure to the inverting member, and the inverting member may be circularly attached and connected to the guide member.

The inverting member may include: an inverting portion configured to protrude and be inverted toward a circular inner portion of the guide member; and a connecting portion configured to be connected to the supporting member and provided with an opening corresponding to the inverting portion.

The inverting member may include a guiding groove concavely formed at a boundary between the inverting portion and the connecting portion to guide an inversion of the inverting member.

The rechargeable battery pack may further include: a battery module including the unit cells, the bus bars, the housing, the first final terminal, and the second final terminal; and a module bus bar configured to electrically connect the first final terminal of the battery module and the second final terminal of another battery module adjacent to the battery module.

The module bus bar may be provided with a third through-hole corresponding to the inverting member such that the inverting member is inverted by an internal pressure at the first final terminal.

The second final terminal may have a first thickness at the electrode terminal, and the second final terminal may have a second thickness thicker than the first thickness and corresponding to a height of the first final terminal at the module bus bar.

Each of the unit cells may be provided with a vent hole formed in a cap plate to discharge an internal pressure.

A plurality of the vent holes may be connected to the first final terminal through a duct.

The duct may be connected to the first through-hole of the pressure via-member.

The duct may include: branch lines configured to be air-tightly connected to respective vent holes of the plurality of vent holes; and an integrating line connecting the branch lines to be connected to the first through-hole of the pressure via-member.

According to an aspect of one or more embodiments of the present invention, the high voltage interruption device (the connection or separation of the pressure via-member or the guide member and the inverting member) is provided in the first final terminal of the module, and the high voltage interruption device operates by the internal pressure (i.e. an excessive pressure) generated during the defect of the unit cell, that is, the inverting member is separated from the pressure via-member to interrupt the high voltage of the first final terminal, and thereby the safety of the rechargeable battery pack may be improved.

In addition, since the high voltage in the high voltage interruption device of the first final terminal is mechanically interrupted by the excessive pressure, even when the defect of the unit cell is not detected, the safety of the rechargeable battery pack may be ensured or improved.

BRIEF DESCRIPTION OF THE DRAWINGS

FIG. 11 illustrates a cross-sectional view of a state in which a current of a high voltage is interrupted when an excessive pressure is applied to a first final terminal (a high voltage interruption device) of the rechargeable battery pack of FIG. 10.

DESCRIPTION OF SYMBOLS

Figure 1:
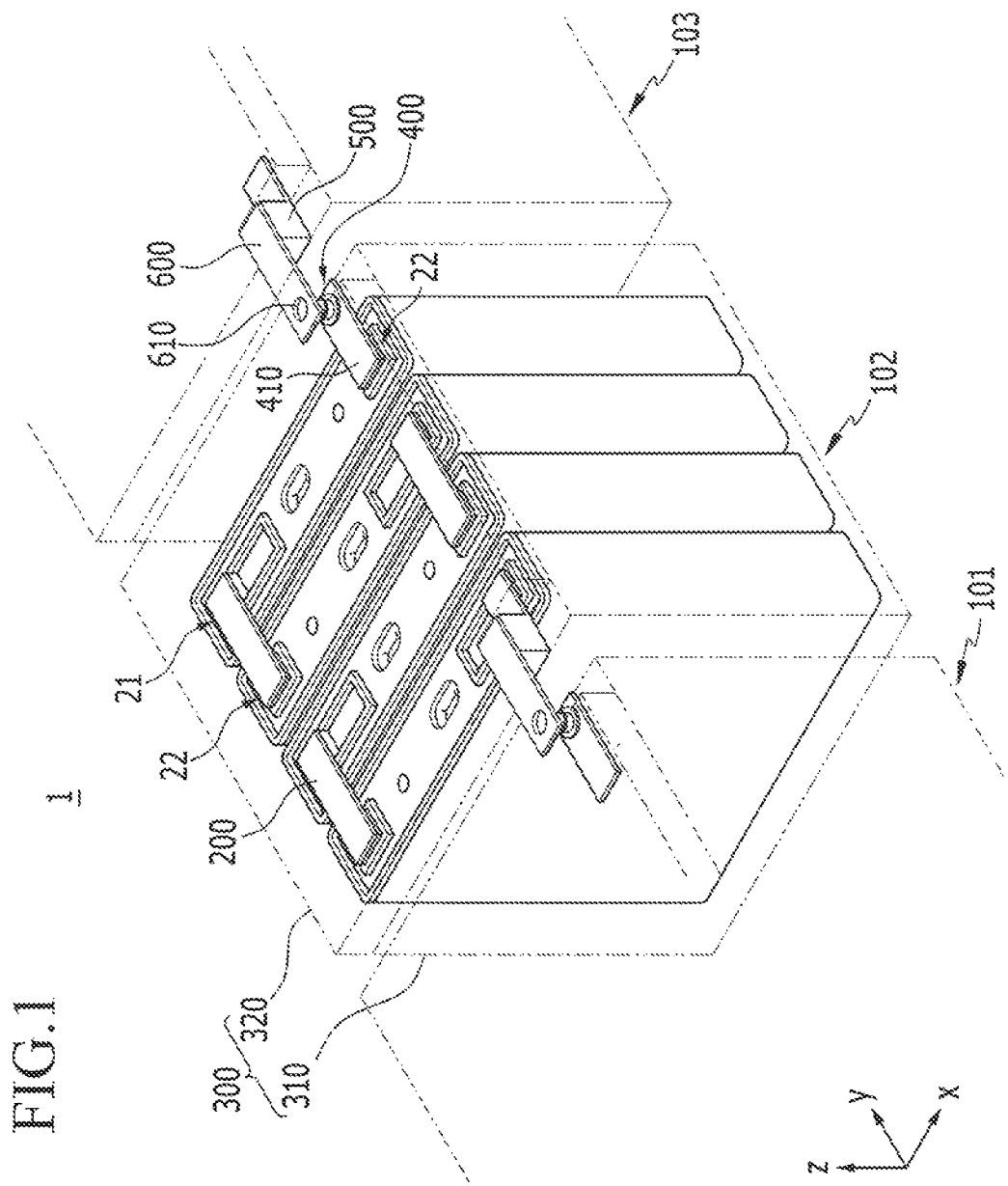
FIG. 1 illustrates a perspective view of a rechargeable battery pack according to an exemplary embodiment of the present invention.

| | |
|---|---|
| 1, 2: rechargeable battery pack | 11, 12: negative, positive electrode |
| 11a, 12a: coated region | 10: electrode assembly |
| 11b, 12b: uncoated region | 13: separator |
| 15: case | 20: cap plate |
| 21, 22: negative, positive electrode terminal | 21a, 22a: rivet terminal |
| 21b, 22b: flange | 21c, 22c: plate terminal |
| 24: vent hole | 25: vent plate |
| 25a: notch | 27: sealing cap |
| 29: electrolyte injection opening | 31: insulation member |
| 36, 37: negative, positive electrode gasket | 40: overcharge safety device (OSD) |
| 41: short-circuit tab | 42: short-circuit hole |
| 43: short-circuit member | 46: top plate |
| 51, 52: negative, positive electrode lead tab | |
| 61, 62: negative, positive electrode insulation member | |
| 100: unit cell | 101, 102, 103: battery module |
| 200: bus bar | 300: housing |
| 310: body | 320: cover |
| 400, 500: first, second final terminal | 410: pressure via-member |
| 411: first through-hole | 412: guide member |
| 420: inverting member | 421: inverting portion |
| 422: opening | 423: connecting portion |
| 424: guiding groove | 430: supporting member |
| 431: second through-hole | 600: module bus bar |
| 610: third through-hole | 700: duct |
| 710: branch line | 720: integrating line |
| H1, H2: terminal hole | t1, t2: first, second thickness |

DETAILED DESCRIPTION

The present invention will be described more fully hereinafter with reference to the accompanying drawings, in which some exemplary embodiments of the present invention are shown. As those skilled in the art will realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
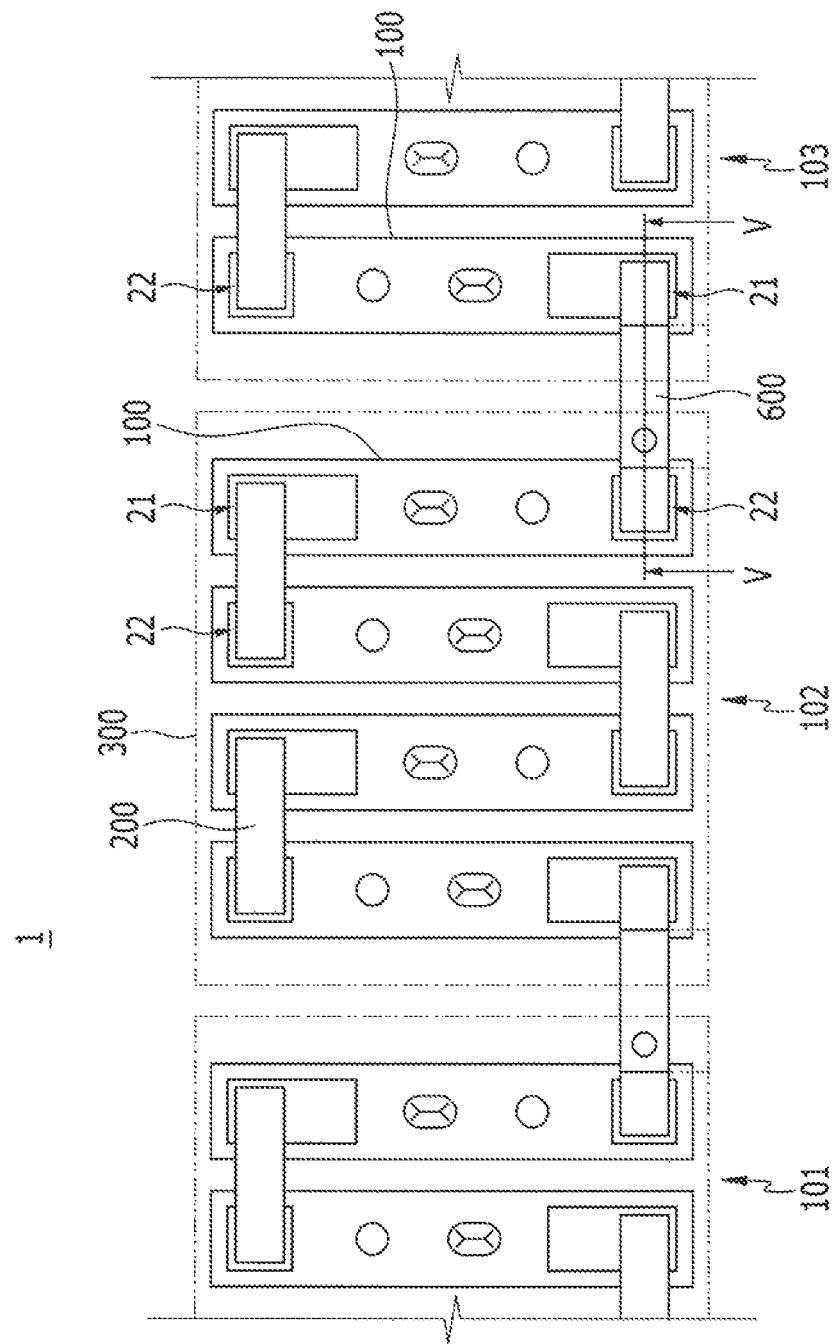
FIG. 2 illustrates a top plan view of the rechargeable battery pack of FIG. 1.

FIG. 1 illustrates a perspective view of a rechargeable battery pack according to an exemplary embodiment of the present invention; and FIG. 2 illustrates a top plan view of the rechargeable battery pack of FIG. 1. Referring to FIG. 1 and FIG. 2, a rechargeable battery pack 1 according to an exemplary embodiment includes a plurality of battery modules 101, 102, and 103. Although not illustrated, in one embodiment, the rechargeable battery pack may be formed with one battery module. For convenience of description, a rechargeable battery pack including one battery module may be described, although a rechargeable battery pack including a plurality of battery modules may also be described.

The rechargeable battery pack 1 includes unit cells 100 capable of being repeatedly charged and discharged, bus bars 200 for electrically connecting electrode terminals 21 and 22 of the unit cells 100, a housing 300 for accommodating the unit cells 100, a first final terminal 400 and a second final terminal 500 for drawing the electrode terminals 22 and 21 provided at respective outermost sides of the unit cells 100 out of the housing 300, and a high voltage interruption device provided at the first final terminal 400.

In the present exemplary embodiment, the unit cells 100 are exemplarily illustrated as having a prismatic shape. In another embodiment, although not illustrated, the unit cells may be formed as a pouch type. In another embodiment, electrode terminals of the unit cells of the pouch type may be drawn out in opposite directions of a pouch, and the bus bars may respectively and electrically connect the electrode terminals at opposite sides of the unit cells.

Figure 3:
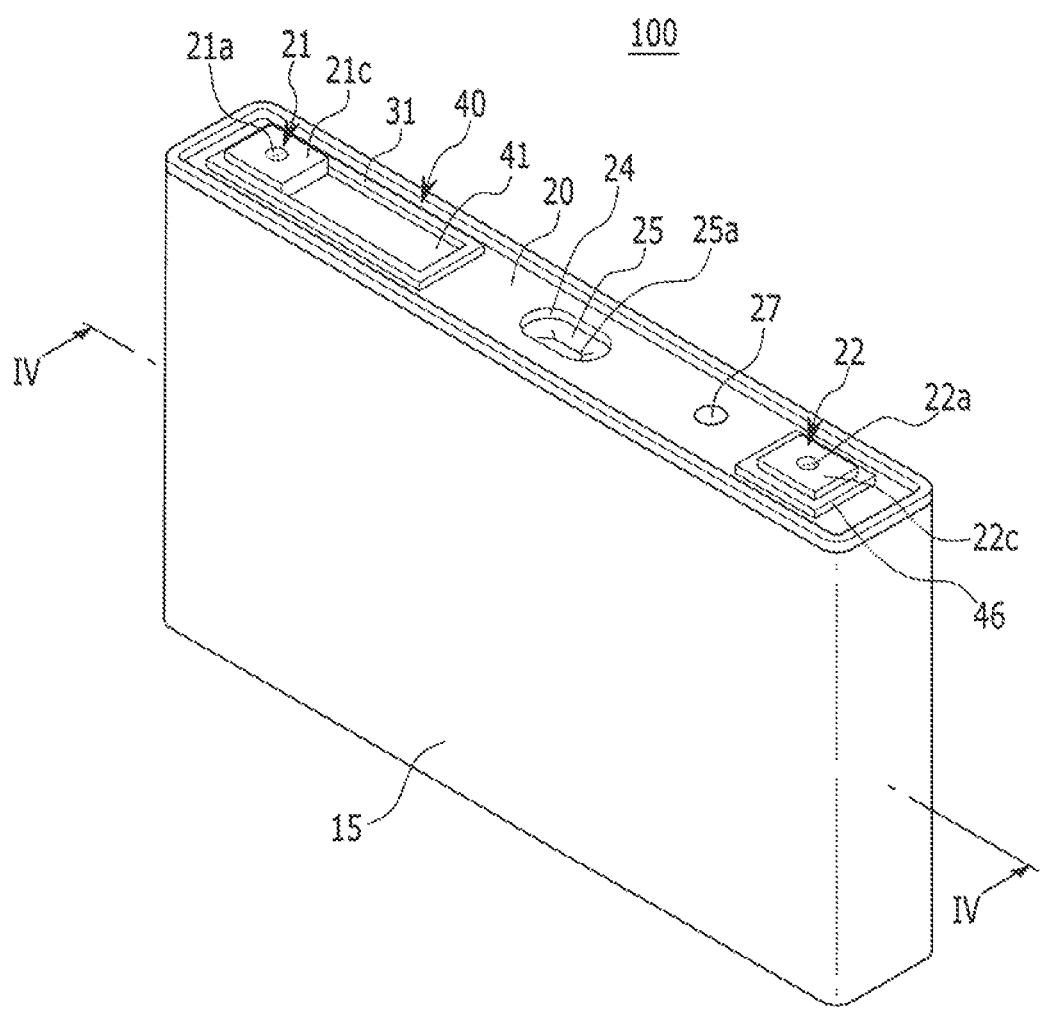
FIG. 3 illustrates a perspective view of a unit cell applied to the rechargeable battery pack of FIG. 1.
Figure 4:
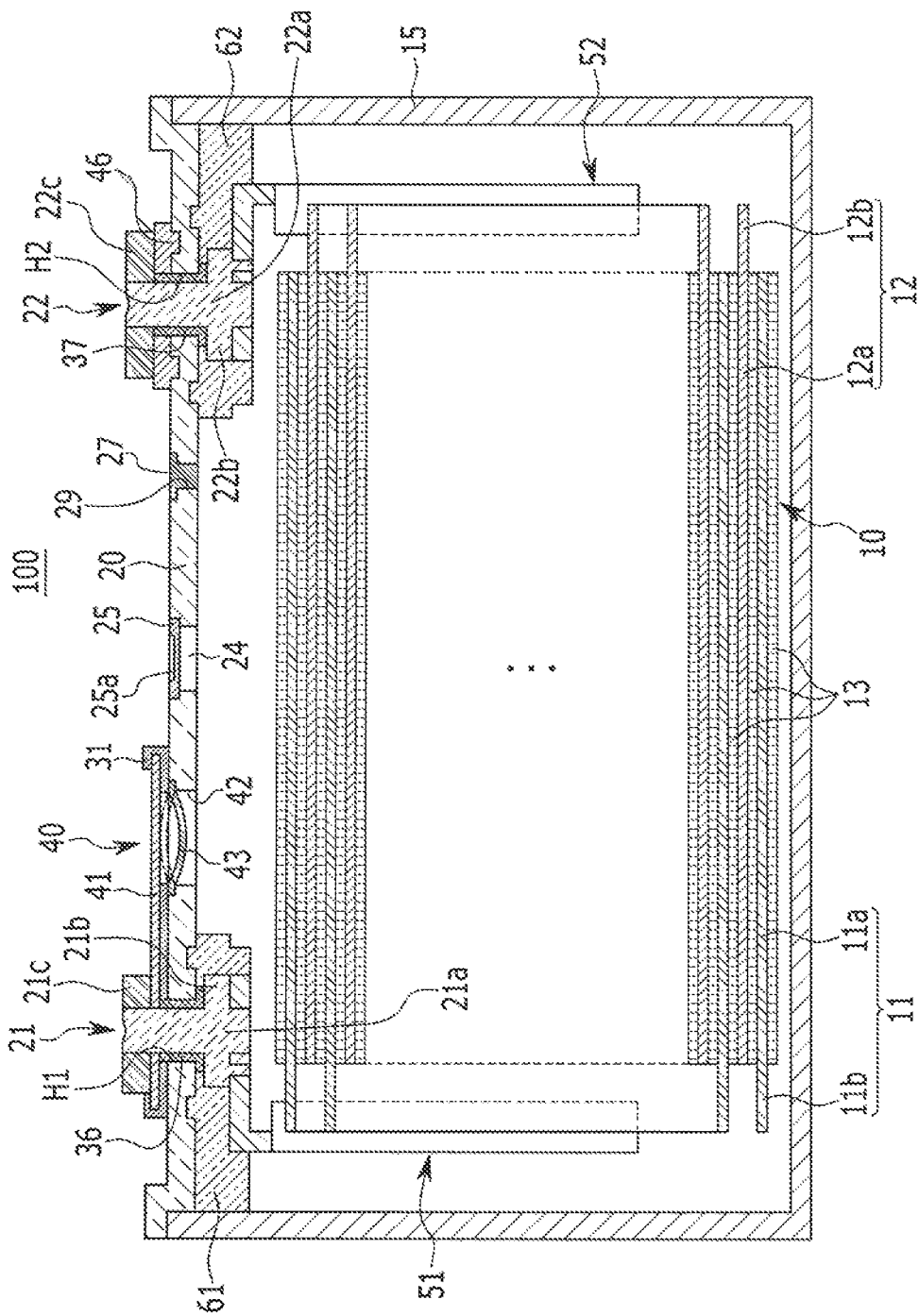
FIG. 4 illustrates a cross-sectional view of the unit cell of FIG. 3, taken along the line IV-IV.

FIG. 3 illustrates a perspective view of a unit cell applied to the rechargeable battery pack of FIG. 1; and FIG. 4 illustrates a cross-sectional view of the rechargeable battery pack of FIG. 3, taken along the line IV-IV. Referring to FIG. 3 and FIG. 4, the unit cell 100 includes an electrode assembly 10 for charging or discharging a current, a case 15 for accommodating the electrode assembly 10, a cap plate 20 combined to an opening of the case 15, electrode terminals (negative and positive electrode terminals) 21 and 22 provided at the cap plate 20, and an overcharge safety device (OSD) 40.

For example, a negative electrode 11 and a positive electrode 12 are disposed at opposite sides of a separator 13, which is an insulator, and the positive electrode 12, the negative electrode 11, and the separator 13 are spirally wound in a jelly roll state to form the electrode assembly 10. In another embodiment, although not illustrated, the electrode assembly may be formed as a stack type in which the negative electrode, the separator, and the positive electrode are stacked.

The negative and positive electrodes 11 and 12 respectively include coated regions 11a and 12a where an active material is coated on current collectors made of a metal plate, and uncoated regions 11b and 12b where an active material is not coated thereon and which are formed as exposed current collectors.

The uncoated region 11b of the negative electrode 11 is formed at an end portion of the negative electrode 11 along the wound negative electrode 11, and the uncoated region 12b of the positive electrode 12 is formed at an end portion of the positive electrode 12 along the wound positive electrode 12. Thus, the uncoated regions 11b and 12b are respectively disposed at opposite end portions of the electrode assembly 10.

In an embodiment, for example, the case 15 is substantially formed having a cuboid shape in which a space for accommodating the electrode assembly 10 and an electrolyte solution is defined, and is formed with the opening for connecting inner and outer spaces at one side of the cuboid. The opening allows the electrode assembly 10 to be inserted into the case 15.

The cap plate 20 is installed at the opening of the case 15 to seal the case 15. In an embodiment, for example, the case 15 and the cap plate 20 may be formed of aluminum to be welded to each other.

In addition, the cap plate 20 is provided with an electrolyte injection opening 29, a vent hole 24, and terminal holes H1 and H2. After combining the cap plate 20 to the case 15, the electrolyte injection opening 29 allows the electrolyte solution to be injected into the case 15. After being injected with the electrolyte solution, the electrolyte injection opening 29 is sealed with a sealing cap 27.

The vent hole 24 is sealed with a vent plate 25 so as to discharge internal pressure of the unit cell 100. The vent plate 25 is ruptured to open the vent hole 24 when the internal pressure of the unit cell 100 reaches a certain pressure (e.g., a predetermined or excessive pressure). In an embodiment, the vent plate 25 is provided with a notch 25a that induces the rupture.

The electrode terminals 21 and 22 are provided in the respective terminal holes H1 and H2 of the cap plate 20, and are electrically coupled to the electrode assembly 10. That is, the negative terminal 21 is electrically coupled to the negative electrode 11 of the electrode assembly 10, while the positive terminal 22 is electrically coupled to the positive electrode 12 of the electrode assembly 10. Thus, the electrode assembly 10 is drawn out of the case 15 through the negative and positive terminals 21 and 22.

In an embodiment, the electrode terminals 21 and 22 have a same structure inside of the cap plate 20. Thus, the same structure will be described together, and since the electrode terminals 21 and 22 have different structures from each other outside of the cap plate 20, the different structures will be separately described.

The electrode terminals 21 and 22 include rivet terminals 21a and 22a that are respectively installed at the terminal holes H1 and H2 of the cap plate 20, flanges 21b and 22b that are widely formed inside of the cap plate 20 while being integrally formed with the rivet terminals 21a and 22a, and plate terminals 21c and 22c that are connected to the rivet terminals 21a and 22a by being riveted or welded while being disposed outside of the cap plate 20.

Negative and positive gaskets 36 and 37 are respectively provided between the rivet terminals 21a and 22a of the negative and positive terminals 21 and 22 and the inner sides of the terminal holes H1 and H2 to seal and electrically insulate between the rivet terminals 21a and 22a of the electrode terminals 21 and 22 and the cap plate 20.

In an embodiment, the negative and positive electrode gaskets 36 and 37 are provided so as to be further extended between the flanges 21b and 22b and the inner side of the cap plate 20, and further seal and electrically insulate between the flanges 21b and 22b and the cap plate 20. That is, by installing the electrode terminals 21 and 22 at the cap plate 20, the negative and positive electrode gaskets 36 and 37 prevent or substantially prevent leakage of the electrolyte solution through the terminal holes H1 and H2.

Negative and positive electrode lead tabs 51 and 52 allow the electrode terminals 21 and 22 to be electrically connected to the positive and negative electrodes 11 and 12, respectively. In an embodiment, by combining the negative and positive electrode lead tabs 51 and 52 with lower end portions of the rivet terminals 21a and 22a and then caulking the lower end portions, the negative and positive electrode lead tabs 51 and 52 are supported by the flanges 21b and 22b and are connected to the lower end portions of the rivet terminals 21a and 22a.

Negative and positive insulating members 61 and 62 are respectively installed between the negative and positive electrode lead tabs 51 and 52 and the cap plate 20 to electrically insulate therebetween. Further, the negative and positive insulating members 61 and 62 are combined to the cap plate 20 at one side thereof, and enclose the negative and positive electrode lead tabs 51 and 52, the rivet terminals 21a and 22a, and the flanges 21b and 22b at the other side thereof, thereby stabilizing a connecting structure between them.

The overcharge safety device 40 will be described in connection with the plate terminal 21c of the negative terminal 21, and a top plate 46 will be described in connection with the plate terminal 22c of the positive terminal 22.

The overcharge safety device 40 adjacent to the negative electrode terminal 21 includes a short-circuit tab 41 and a short-circuit member 43 that are separated or short-circuited depending on the internal pressure of the unit cell 100. The short-circuit tab 41 is disposed outside of the cap plate 20 while being electrically coupled to the rivet terminal 21a of the negative terminal 21 and interposing an insulating member 31.

The insulating member 31 is disposed between the short-circuit tab 41 and the cap plate 20 to insulate the short-circuit tab 41 from the cap plate 20. For example, the cap plate 20 maintains an electrically insulated state with the negative terminal 21.

In an embodiment, by combining the short-circuit tab 41 and the plate terminal 21c with an upper end portion of the rivet terminal 21a and then caulking the upper end portion of the rivet terminal 21a, the short-circuit tab 41 and the plate terminal 21c are fastened to the upper end portion of the rivet terminal 21a. Thus, the short-circuit tab 41 and the plate terminal 21c are fastened to the cap plate 20 while interposing the insulating member 31 therebetween.

The short-circuit member 43 is installed at a short-circuit hole 42 that is formed in the cap plate 20. While being connected to the negative terminal 21, the short-circuit tab 41 is disposed to be extended over the short-circuit member 43. Thus, the short-circuit tab 41 and the short-circuit member 43 correspond to the short-circuit hole 42, face each other to maintain a separated state therebetween (solid line state) in a normal operating state, and may form a short-circuit state (dashed line state) in which the short-circuit member 43 is inversely deformed when the internal pressure of the unit cells 100 increases, such as due to overcharging.

The top plate 46 adjacent to the positive electrode terminal 22 electrically couples the plate terminal 22c of the positive terminal 22 and the cap plate 20. In an embodiment, for example, the top plate 46 is interposed between the plate terminal 22c and the cap plate 20, and is penetrated by the rivet terminal 22a.

Thus, in an embodiment, by combining the top plate 46 and the plate terminal 22c with an upper end portion of the rivet terminal 22a and then caulking the upper end portion of the rivet terminal 22a, the top plate 46 and the plate terminal 22c are fastened to the upper end portion of the rivet terminal 22a. The plate terminal 22c is installed outside of the cap plate 20 while interposing the top plate 46 therebetween.

In an embodiment, the positive electrode gasket 37 is installed such that it is further extended between the rivet terminal 22a and the top plate 46, such that the positive electrode gasket 37 may prevent the rivet terminal 22a and the top plate 46 from being directly electrically connected to each other. For example, the rivet terminal 22a is electrically connected to the top plate 46 through the plate terminal 22c.

Referring back to FIG. 1 and FIG. 2, the bus bars 200 electrically connect the unit cells 100 in the respective battery modules 101, 102, and 103. In the present exemplary embodiment, the bus bars 200 connect the unit cells 100 in series. In another embodiment, although not illustrated, the bus bars may connect the unit cells in parallel.

Figure 5:
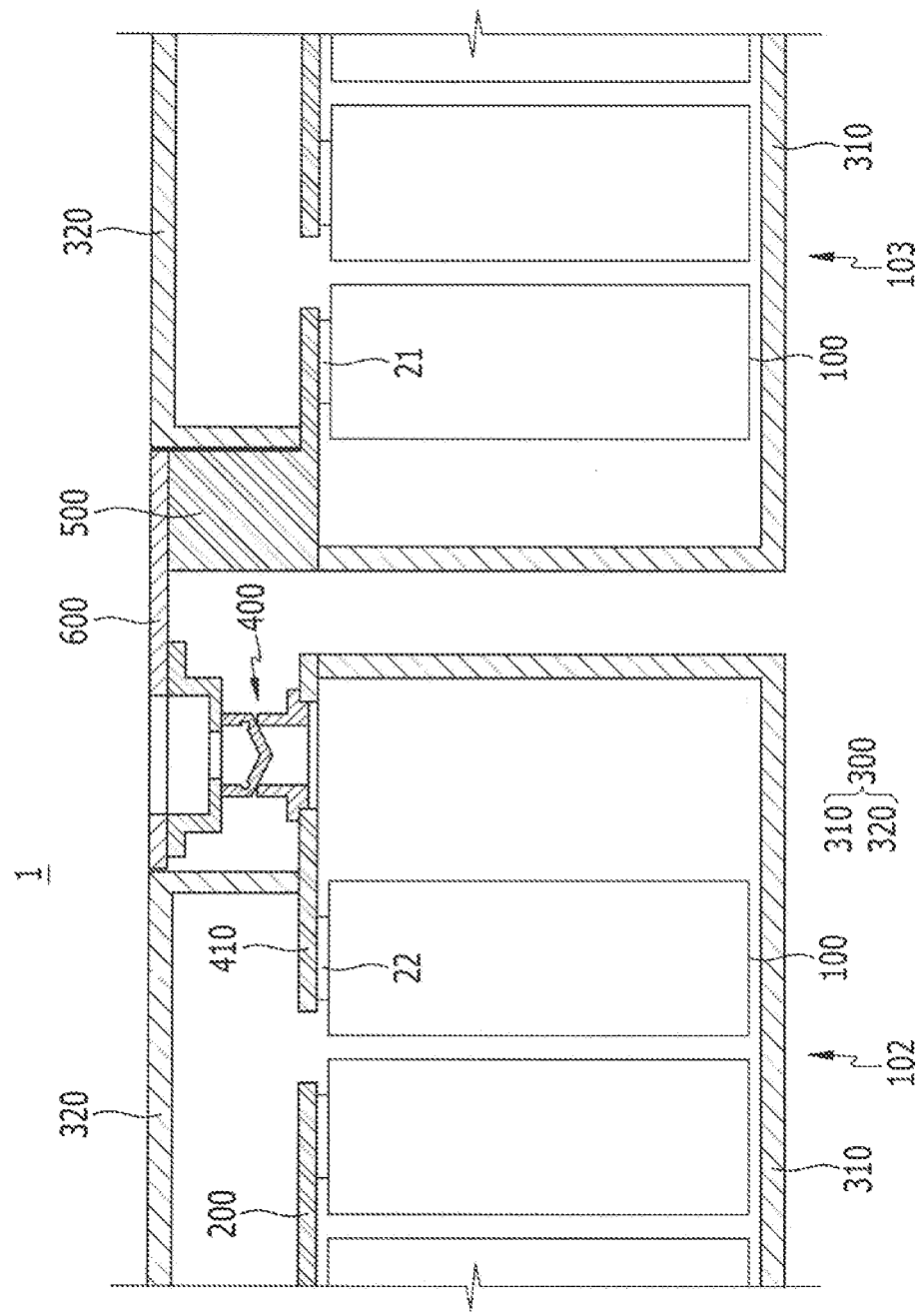
FIG. 5 illustrates a partial cross-sectional view of the rechargeable battery pack of FIG. 2, taken along the line V-V.

FIG. 5 illustrates a cross-sectional view of the rechargeable battery pack of FIG. 2, taken along the line V-V. Referring to FIG. 1, FIG. 2, and FIG. 5, the housing 300 includes a body 310 for accommodating the unit cells 100, and a cover 320 air-tightly combined to the body 310 and covering the unit cells 100.

In the rechargeable battery pack 1 of the exemplary embodiment, the electrode terminals 22 and 21 provided at the outermost unit cells 100 of each of the adjacent battery modules 101, 102, and 103 are drawn out of the housing 300 through first and second final terminals 400 and 500.

The rechargeable battery pack 1 includes a module bus bar 600 for electrically connecting the first final terminal 400 and the second final terminal 500 of the adjacent battery modules 101, 102, and 103 to each other. In an another embodiment in which the rechargeable battery pack is formed with one battery module, the module bus bar is not used.

Figure 6:
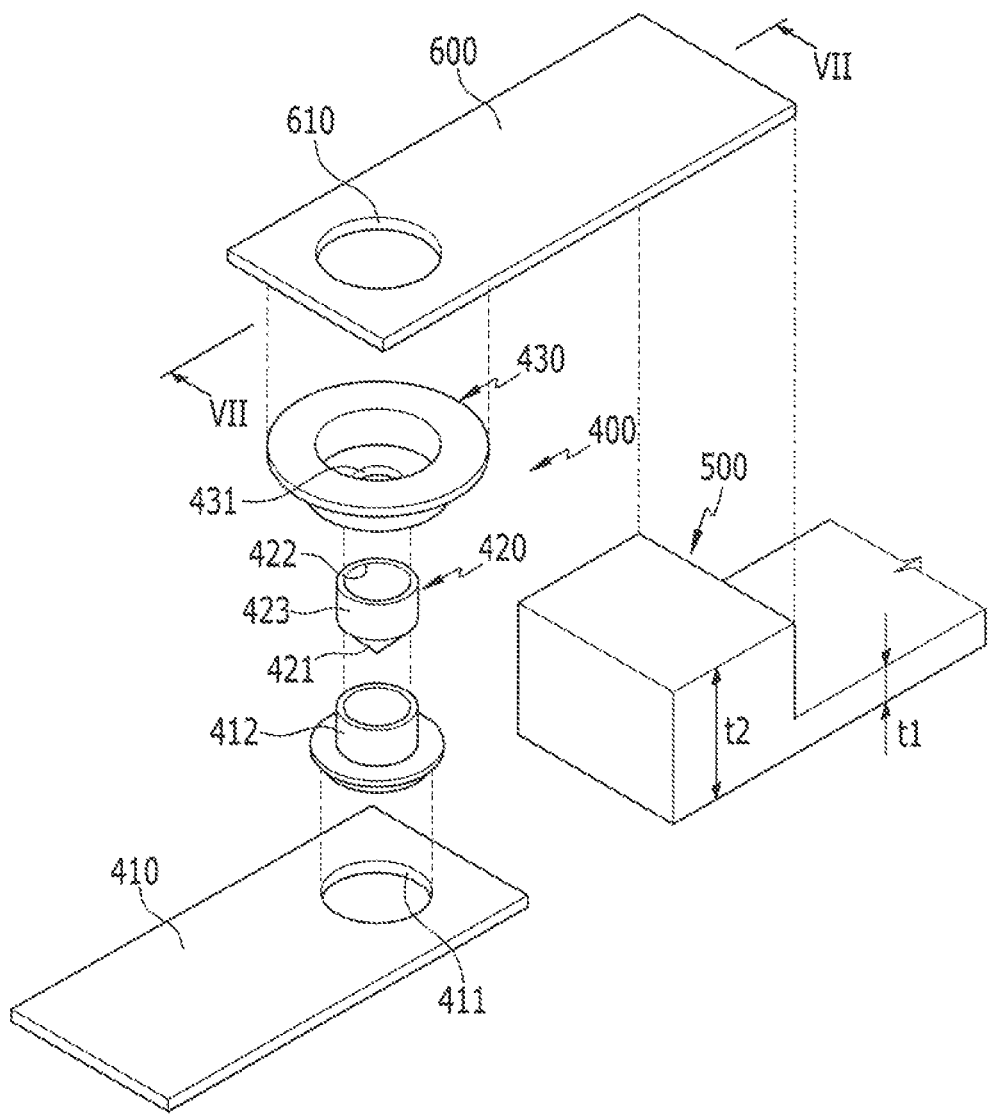
FIG. 6 illustrates an exploded perspective view of a first final terminal (a high voltage interruption device) applied to the rechargeable battery pack of FIG. 1.
Figure 7:
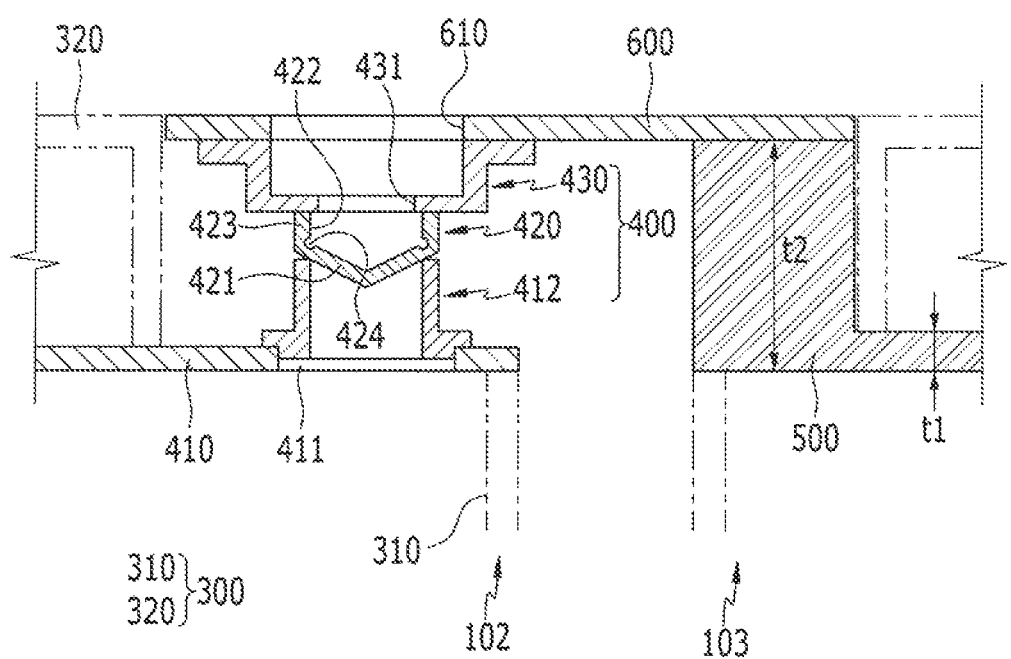
FIG. 7 illustrates a cross-sectional view of a state in which a current of a high voltage flows when a normal pressure is applied to the first final terminal (the high voltage interruption device) of FIG. 6, taken along the line VII-VII.

FIG. 6 illustrates an exploded perspective view of a first final terminal (a high voltage interruption device) applied to the rechargeable battery pack of FIG. 1; and FIG. 7 illustrates a cross-sectional view of a state in which a current of a high voltage flows when a normal pressure is applied to the first final terminal (the high voltage interruption device) of FIG. 6, taken along the line VII-VII.

Referring to FIG. 1, FIG. 6, and FIG. 7, the high voltage interruption device is provided at the first final terminal 400, such that the high voltage line connected by the module bus bar 600 is connected or disconnected according to the internal pressure of the unit cell 100 when a defect in the unit cell 100 occurs.

The first final terminal 400 including the high voltage interruption device includes a pressure via-member 410, an inverting member 420, and a supporting member 430. The pressure via-member 410 is electrically connected to the electrode terminal 22 of the outermost unit cell 100, and passes the internal pressure generated when the defect of the unit cell 100 occurs through a first through-hole 411.

In an embodiment, the body 310 and the cover 320 of the housing 300 are air-tightly combined, such that the excessive pressure generated due to the defect of the unit cell 100 is supplied to the pressure via-member 410 of the high voltage interruption device to pass through the first through-hole 411.

In an embodiment, for example, a portion of the pressure via-member 410 connected to the electrode terminal 22 is disposed inside the housing 300, and the first through-hole 411 connected to the inverting member 420 is drawn out of the housing 300 through a portion in which the body 310 and the cover 320 are combined. That is, the excessive pressure is supplied outside the housing 300 through the first through-hole 411.

The inverting member 420 maintains a state in which the first through-hole 411 of the pressure via-member 410 is closed and sealed according to the internal pressure of the housing 300 such that the high voltage is applied, or it is opened from the closed and sealed state such that the high voltage is interrupted. For example, the inverting member 420, when the internal pressure is normal, maintains a state connected to the first through-hole 411 (see FIG. 7), and when the internal pressure is excessive, it is inverted to be separated or disconnected from the first through-hole 411 (see FIG. 8).

In an embodiment, the pressure via-member 410 includes the first through-hole 411 through which the internal pressure is supplied and which is formed to have a circular shape, and a cylindrical guide member 412 which is electrically and air-tightly connected to the first through-hole 411 and guides the internal pressure to the inverting member 420. In an embodiment, the guide member 412 is combined to a lower portion of the first through-hole 411 to be attached and connected to the pressure via-member 410, and the inverting member 420 is circularly attached and connected to an upper portion of the guide member 412.

The inverting member 420 includes an inverting portion 421 that is inverted while protruding toward a circular inner portion of the guide member 412, and a connecting portion 423 that is connected to the supporting member 430 and is provided with an opening 422 corresponding to the inverting portion 421. In an embodiment, the inverting member 420 further includes a guiding groove 424 that is concavely formed in an inner boundary between the inverting portion 421 and the connecting portion 423 to effectively guide an inverting operation of the inverting portion 421.

Accordingly, when the internal pressure of the housing 300 increases, the inverting portion 421 is inverted (refer to FIG. 8) by the excessive pressure applied to the inverting portion 421 through the first through-hole 411. That is, in the inverting member 420 of the first final terminal 400, the inverting portion 421 is separated from the guide member 412 to interrupt the high voltage between the pressure via-member 410 and the supporting member 430.

The supporting member 430 is electrically connected to the inverting member 420 to support the inverting member 420. The supporting member 430 is provided with a second through-hole 431 corresponding to the inverting member 420. The opening 422 of the inverting member 420 and the second through-hole 431 of the supporting member 430, when the inverting portion 421 is inverted, may eliminate a resistance pressure that may be generated at an upper portion of the inverting portion 421 such that the inverting operation may be easily performed.

The module bus bar 600 is provided with a third through-hole 610 corresponding to the inverting member 420 such that the inverting member 420 is inverted by the internal pressure at the first final terminal 400. That is, the third through-hole 610 communicates with the second through-hole 431 of the supporting member 430, and may eliminate a resistance pressure that may be generated at an upper portion of the inverting portion 421 when the inverting portion 421 is inverted by the internal pressure.

In addition, the second final terminal 500 is formed to have a thin first thickness t1 at the electrode terminal 21, and is formed to have a second thickness t2 thicker than the first thickness t1 and corresponding to a height of the first final terminal 400 at the module bus bar 600. Accordingly, the module bus bar 600 electrically connects the first and second final terminals 400 and 500 to be parallel. That is, variation of the module bus bar 600 due to height deviation of the battery modules 101, 102, and 103 may be prevented or substantially prevented.

Figure 8:
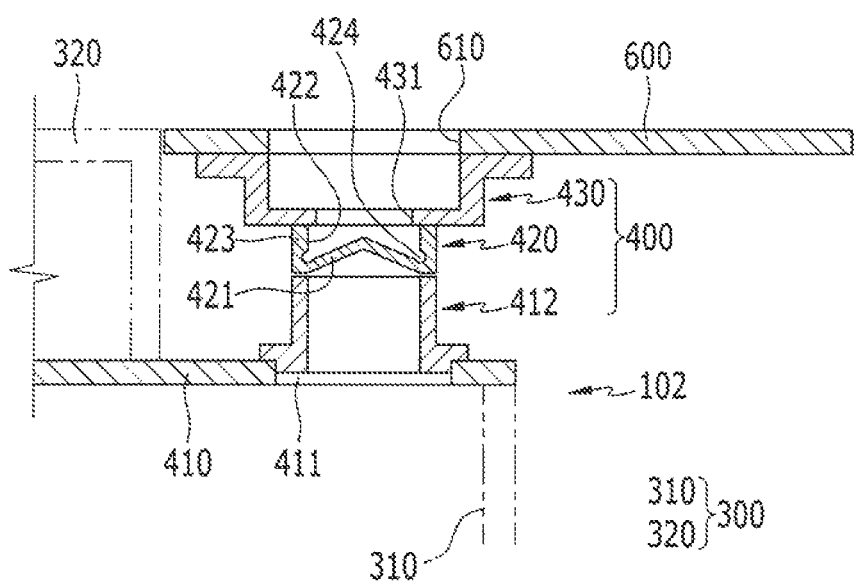
FIG. 8 illustrates a cross-sectional view of a state in which a current of a high voltage is interrupted when an excessive pressure is applied to the first final terminal (the high voltage interruption device) of FIG. 7.

FIG. 8 illustrates a cross-sectional view of a state in which a current of a high voltage is interrupted when an excessive pressure is applied to the first final terminal (the high voltage interruption device) of FIG. 7. Referring to FIG. 8, when a defect occurs in the unit cell 100 of the battery module 102 while the rechargeable battery pack 1 operates in a state of FIG. 7, the internal pressure of the housing 300 becomes an excessive pressure.

In this case, the increased excessive pressure passes through the first through-hole 411 and the guide member 412 of the pressure via-member 410 provided in the first final terminal 400 in the housing 300 to be applied to the inverting member 420, and then causes the inverting portion 421 to be inverted along the guiding groove 424. In an embodiment, the guiding groove 424 allows the inverting portion 421 to be easily inverted at the connecting portion 423. The opening 422, the second through-hole 431, and the third through-hole 610 provided at the upper portion of the inverting portion 421 may eliminate the resistance pressure that may be generated at the upper portion of the inverting portion 421.

As such, as the inverting portion 421 is separated from guide member 412, the high voltage of the module is interrupted between the first final terminal 400 and the module bus bar 600. Accordingly, the battery module 102 in which the defect of the unit cell 100 occurred stops its operation, and the electrical connection with the battery module 103 adjacent thereto is disconnected.

As such, when the defect of the unit cell 100 occurs, since the inverting portion 421 is separated from the guide member 412 such that the high voltage of the battery module 102 is interrupted, even if the defect of the unit cell 100 is not detected, such as using a control unit (not shown) in the rechargeable battery pack 1, the safety of the rechargeable battery pack 1 and a vehicle, for example, in which the rechargeable battery pack 1 may be installed may be ensured.

Since the first final terminal 400 is provided with the pressure via-member 410 and the inverting member 420 such that the high voltage of the battery modules 101, 102, and 103 is applied or interrupted according to their electrical connection or disconnection, the operation defects of the unit cell 100 decreases, and possibility of high voltage arc and ignition may decrease according to resistance decrease of the high voltage wire.

Accordingly, power of the rechargeable battery pack 1 increases, and as resistance distribution of a high voltage connection system decreases, reliability of free charge may be ensured. That is, in the rechargeable battery pack 1, durability of high voltage parts may be improved.

Herein, another exemplary embodiment of the present invention will be described, and, in this case, further description of the same configurations as the above-described exemplary embodiment will be omitted and different configurations will be described.

Figure 9:
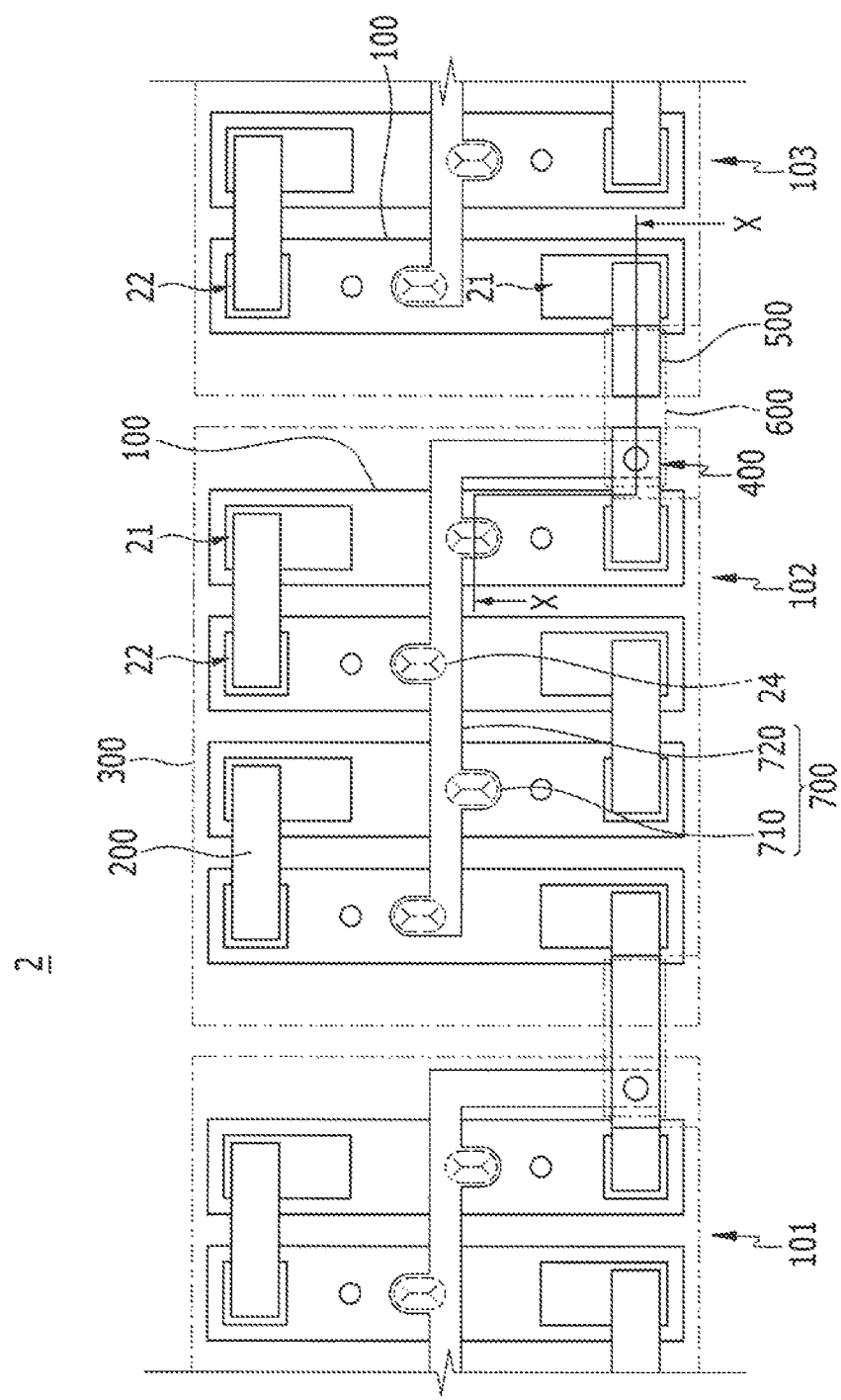
FIG. 9 illustrates a top plan view of a rechargeable battery pack according to another exemplary embodiment of the present invention.
Figure 10:
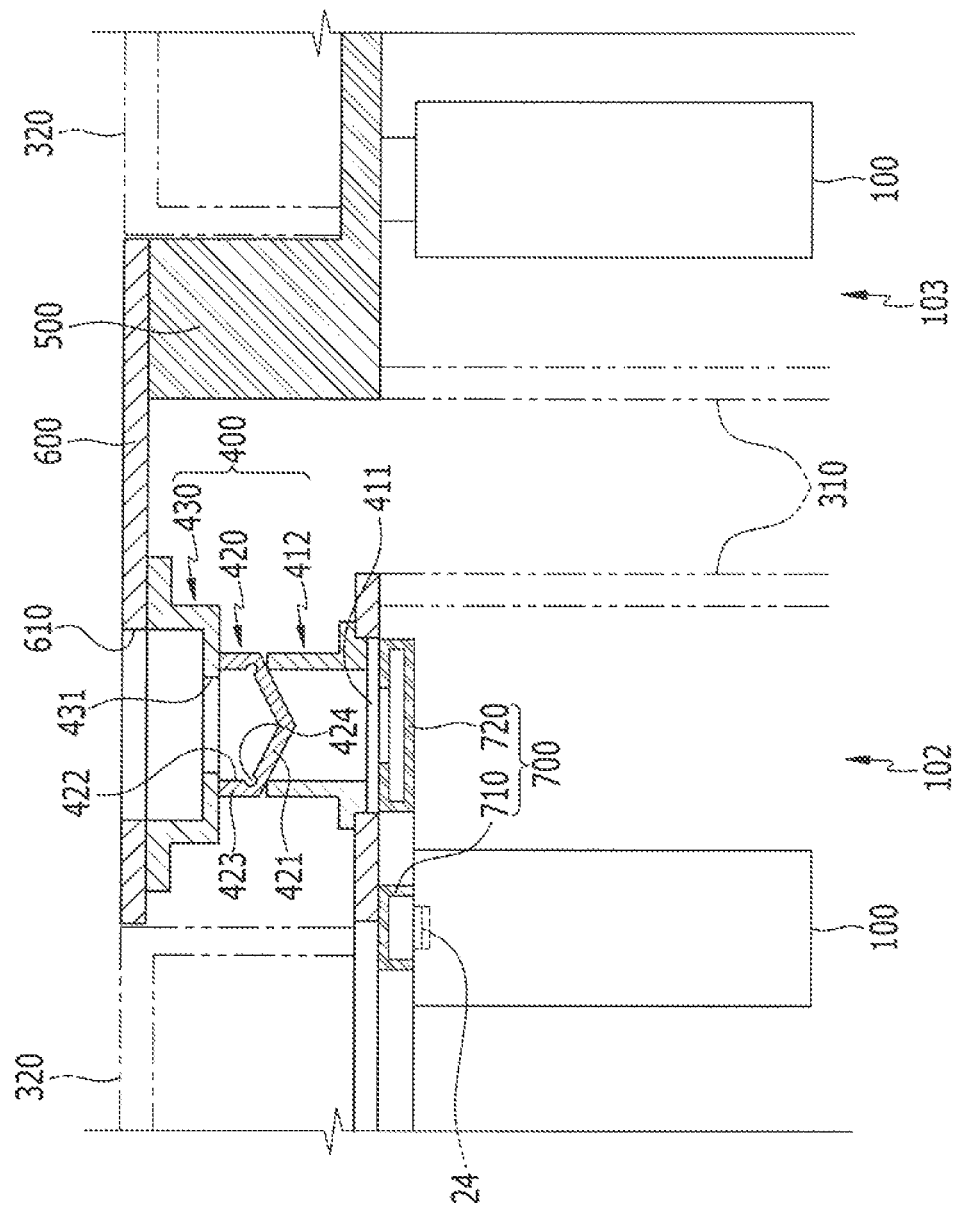
FIG. 10 illustrates a partial cross-sectional view of the rechargeable battery pack of FIG. 9, taken along the line X-X.

FIG. 9 illustrates a top plan view of a rechargeable battery pack according to another exemplary embodiment of the present invention; and FIG. 10 illustrates a cross-sectional view of the rechargeable battery pack of FIG. 9, taken along the line X-X. Referring to FIG. 9 and FIG. 10, a rechargeable battery pack 2 according to another exemplary embodiment includes a duct 700.

The duct 700 is configured such that a plurality of vent holes 24 provided in the plurality of the unit cells 100 accommodated in the battery module 102 are connected to the first final terminal 400. The excessive pressure generated when the defect of the unit cells 100 occurs passes through the duct 700 to be supplied to the first final terminal 400. For this purpose, the duct 700 is connected to the first through-hole 411 of the pressure via-member 410.

In an embodiment, for example, the duct 700 includes branch lines 710 air-tightly connected to each of the vent holes 24, and an integrating line 720 that connects the branch lines 710 to be connected to the first through-hole 411 of the pressure via-member 410. Accordingly, the body 310 and the cover 320 of the housing 300 may not be air-tightly maintained.

FIG. 11 illustrates a cross-sectional view of a state in which a current of a high voltage is interrupted when the excessive pressure is applied to a first final terminal (a high voltage interruption device) of the rechargeable battery pack of FIG. 10. Referring to FIG. 11, while the rechargeable battery pack 2 operates, when a defect occurs in the unit cell 100 of the battery module 102, the excessive pressure increased in the unit cell 100 passes through the vent hole 24, the branch line 710, and the integrating line 720.

In this case, the increased excessive pressure passes through the first through-hole 411 and the guide member 412 of the pressure via-member 410 included in the first final terminal 400 via the duct 700 to invert the inverting portion 421 of the inverting member 420 into an inverted state.

As the inverting portion 421 is separated from the guide member 412, the high voltage of the battery module 102 is interrupted between the first final terminal 400 and the module bus bar 600. Accordingly, the battery module 102 in which the defect of the unit cell 100 occurred stops its operation, and the electrical connection with the battery module 103 adjacent thereto is disconnected. Accordingly, the safety of the rechargeable battery pack 2 may be ensured.

While the present invention has been described in connection with what are presently considered to be some practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery pack comprising:
   unit cells configured to be repeatedly charged or discharged;
   bus bars configured to electrically connect electrode terminals of the unit cells;
   a housing configured to accommodate the unit cells;
   a first final terminal and a second final terminal configured to draw respective electrode terminals provided at outermost unit cells of the unit cells out of the housing; and
   a high voltage interruption device provided at the first final terminal and configured to electrically connect or disconnect a high voltage line according to an internal pressure generated and discharged from any of the unit cells into the housing,
   wherein each of the unit cells comprises a vent hole to discharge an internal pressure of the respective unit cell into the housing,
   wherein the first final terminal provided with the high voltage interruption device comprises:
   a pressure via-member configured to be electrically connected to an electrode terminal of an outermost unit cell of the outermost unit cells and to pass the internal pressure generated and discharged from any of the unit cells through a first through-hole;
   an inverting member configured to supply or interrupt a high voltage by closing or opening the first through-hole of the pressure via-member according to the internal pressure; and
   a supporting member configured to support the inverting member and electrically connect to the inverting member,
   wherein the rechargeable battery pack further comprises:
   a battery module comprising the unit cells, the bus bars, the housing, the first final terminal, and the second final terminal; and
   a module bus bar configured to electrically connect the first final terminal of the battery module and a second final terminal of another battery module of the rechargeable battery pack, the another battery module being adjacent to the battery module, and
   wherein the module bus bar is provided with a third through-hole corresponding to the inverting member such that the inverting member is inverted by an internal pressure at the first final terminal.

2. The rechargeable battery pack of claim 1, wherein the housing comprises:
   a body configured to accommodate the unit cells; and
   a cover configured to be air-tightly combined to the body to cover the unit cells.

3. The rechargeable battery pack of claim 2, wherein, in the pressure via-member,
   a portion connected to the electrode terminal is arranged inside the housing, and
   a portion connected to the inverting member at a side of the first through-hole is drawn out through a portion in which the body and the cover are combined.

4. The rechargeable battery pack of claim 1, wherein
   when the internal pressure is a normal pressure, the inverting member maintains a state attached to the first through-hole, and
   when the internal pressure is an excessive pressure greater than the normal pressure, the inverting member is inverted to be separated from the first through-hole.

5. The rechargeable battery pack of claim 1, wherein
   the first through-hole of the pressure via-member has a circular shape,
   the pressure via-member includes a cylindrical guide member configured to be air-tightly and electrically connected to the first through-hole to guide the internal pressure to the inverting member, and
   the inverting member is circularly attached and connected to the guide member.

6. The rechargeable battery pack of claim 5, wherein the inverting member comprises:
   an inverting portion configured to protrude and be inverted toward a circular inner portion of the guide member; and
   a connecting portion configured to be connected to the supporting member and provided with an opening corresponding to the inverting portion.

7. The rechargeable battery pack of claim 6, wherein the inverting member includes a guiding groove concavely formed at a boundary between the inverting portion and the connecting portion to guide an inversion of the inverting member.

8. The rechargeable battery pack of claim 1, wherein the vent hole of each of the unit cells is formed in a cap plate of the unit cell.

9. The rechargeable battery pack of claim 8, wherein a plurality of the vent holes are connected to the first final terminal through a duct.

10. The rechargeable battery pack of claim 9, wherein the duct is connected to the first through-hole of the pressure via-member.

11. The rechargeable battery pack of claim 10, wherein the duct includes:
   branch lines configured to be air-tightly connected to respective vent holes of the plurality of vent holes; and
   an integrating line connecting the branch lines to be connected to the first through-hole of the pressure via-member.

12. A rechargeable battery pack comprising:
   unit cells configured to be repeatedly charged or discharged;
   bus bars configured to electrically connect electrode terminals of the unit cells;
   a housing configured to accommodate the unit cells;
   a first final terminal and a second final terminal configured to draw respective electrode terminals provided at outermost unit cells of the unit cells out of the housing; and
   a high voltage interruption device provided at the first final terminal and configured to electrically connect or disconnect a high voltage line according to an internal pressure generated and discharged from any of the unit cells into the housing,
   wherein each of the unit cells comprises a vent hole to discharge an internal pressure of the respective unit cell into the housing,
   wherein the first final terminal provided with the high voltage interruption device comprises:
   a pressure via-member configured to be electrically connected to an electrode terminal of an outermost unit cell of the outermost unit cells and to pass the internal pressure generated and discharged from any of the unit cells through a first through-hole;
   an inverting member configured to supply or interrupt a high voltage by closing or opening the first through-hole of the pressure via-member according to the internal pressure; and
   a supporting member configured to support the inverting member and electrically connect to the inverting member,
   wherein the rechargeable battery pack further comprises:
   a battery module comprising the unit cells, the bus bars, the housing, the first final terminal, and the second final terminal; and
   a module bus bar configured to electrically connect the first final terminal of the battery module and a second final terminal of another battery module of the rechargeable battery pack, the another battery module being adjacent to the battery module, and
   wherein the second final terminal of the another battery module has a first thickness at an electrode terminal provided at an outermost unit cell of unit cells of the another battery module, and
   the second final terminal of the another battery module has a second thickness thicker than the first thickness and corresponding to a height of the first final terminal at the module bus bar.

* * * * *